United States Patent [19]

Axelrod

[11] Patent Number: 5,776,523
[45] Date of Patent: Jul. 7, 1998

[54] METHOD FOR PRESERVING BAITS

[76] Inventor: Herbert R. Axelrod, 211 W. Sylvania Ave., Deal, N.J. 07753

[21] Appl. No.: 774,922

[22] Filed: Dec. 27, 1996

[51] Int. Cl.⁶ ........................................... A23L 3/34
[52] U.S. Cl. ..................... 426/1; 426/268; 426/310; 426/332; 426/532; 426/654
[58] Field of Search .................. 426/1, 2, 268, 426/310, 332, 335, 573, 654, 657, 532

[56] References Cited

U.S. PATENT DOCUMENTS

| | | | |
|---|---|---|---|
| 2,693,417 | 11/1954 | Orth, Jr. | 99/3 |
| 3,361,566 | 1/1968 | Axelrod | 99/3 |
| 3,528,816 | 9/1970 | Nagae | 99/3 |
| 3,719,496 | 3/1973 | Chen et al. | 99/2 |
| 3,876,803 | 4/1975 | Stephan et al. | 426/1 |
| 4,053,640 | 10/1977 | Takasugi | 426/1 |
| 4,160,847 | 7/1979 | Orth, Jr. | 426/1 |
| 4,161,158 | 7/1979 | Kartesz | 119/1 |
| 4,251,547 | 2/1981 | Liggett | 426/1 |
| 4,362,748 | 12/1982 | Cox | 426/1 |
| 4,503,077 | 3/1985 | Horton | 426/1 |

OTHER PUBLICATIONS

Goodman and Gilman's "The Pharmacological Basis of Therapeutics" Sixth Edition Macmillan Publishing Co., Inc.; pp. 970–971; date unknown.

*Primary Examiner*—Milton Cano
*Attorney, Agent, or Firm*—Hayes, Soloway, Hennessey, Grossman & Hage, P.C.

[57] ABSTRACT

A method for preserving fish bait comprising supplying fish bait and first immersing the bait in a first aqueous sterilizing solution wherein the concentration of said sterilizing solution which comprises an aqueous solution of formalin and the time of immersion in the solution are adjusted to prevent decay via bacterial action and to increase the hardness of the bait. The bait is then removed from the sterilizing solution and immersed in running water to remove substantially residual sterilizing solution which therein provides a hardened sterilized bait. The hardened and sterilized bait is then placed in a container which contains a sufficient amount of a second aqueous solution which comprises on aqueous to solution of a grain alcohol which prevents further bacterial and/or viral decay and which maintains the fish in a hydrated state for use as a bait product.

14 Claims, No Drawings

METHOD FOR PRESERVING BAITS

FIELD OF THE INVENTION

The present invention relates generally to a method for preserving fish bait which provides a bait product with an extended shelf life and the ability to be trolled at much higher speed than frozen bait. More specifically, the present invention comprises the sterilization of fish bait with a chemical preserving agent to control bacterial and viral action, which also acts to harden the bait, followed by removal of said chemical preserving agent, and placement of said bait in a container with a sufficient amount of an alcohol or other antiseptic to maintain the bait in a hydrated form and preserving said bait against further bacterial activity, ultimately providing a bait product with indefinite shelf life.

BACKGROUND ART

The most successful fishing baits are smaller fishes which are the natural diets of the fish being sought. While using live bait is ideal, many small fishes are killed in the collecting process. They are then frozen and sold in bait stores and fishing marinas as frozen bait. As such, they must be displayed and stored in large freezer lockers in order to keep them from decay. These lockers quickly develop an unpleasant aroma which requires constant cleaning if the odor is to be controlled.

Once the fisherman buys the frozen bait, it must be maintained in the frozen state or the subsequent bacterial activity soon makes the bait unacceptable both for the fish and the fisherman. Often the bait is dragged behind a moving boat in a fishing technique called "trolling". Baits which are trolled only last an hour or so before they are destroyed by the forces of water tearing against their bodies.

A variety of prior art techniques have been uncovered which are directed to the preservation of fish bait by freeze drying and dehydration. For example, in U.S. Pat. No. 3,361,566 to H. R. Axelrod, there is disclosed a "Freeze Dried Food Article for Aquatic Animals", which article is composed primarily of the freeze dried, high protein materials, including earth worms. The food article therein is initially washed and freeze dried in shallow containers, after which the food is warmed to room temperature. The material is then separated into small pieces and may be coated with an adhesive for attachment to an aquarium wall.

Other disclosures similarly report bait preservation in one form or another by freezing methods. For example, In U.S. Pat. No. 3,528,816, to Shoichi Nagae, entitled "Fish Bait With a Fish Hook" there is disclosed the concept of placing the live bait on a fish hook and freezing the hook and bait to a temperature of about minus 25 degrees centigrade. The frozen bait is then kept in a vacuum desiccator, followed by heating and packaging. The bait is then restored by placing it in water and the combination is then ready for fishing.

U.S. Pat. No. 3,719,496 to Chen, et al. entitled "Articles of White Food for Feeding Aquatic Animals and Method of Manufacture" discloses a high protein content food for fishes and aquatic animals, which is prepared by dehydrating worms, quickly freezing and freeze drying the mass. Similarly, in U.S. Pat. No. 4,053,640, there is disclosed a fishing bait which has been ground and pulverized and blended with a surface active agent and subsequently freeze dried. The bait is then pulverized again after freeze drying and is placed in a water permeable sealable container.

In U.S. Pat. No. 4,161,158, entitled "Preservation of Live Fish Bait" a method and composition for preserving live underground (night crawlers) and surface dwelling (meal worms) fish bait is disclosed. The method involves sterilization by immersing the bait in a 10–15 percent by weight aqueous solution of ethanol for 10 to 15 seconds. The bait is then packed in a media containing nutrients (peat moss), an antibiotic (penicillin) and a stress reliever (cortizone), and maintained at a temperature between 34 and 55 degrees Fahrenheit.

In U.S. Pat. No. 4,503,077 entitled "Method for Preserving Fishing Bait", there is disclosed a method for preserving bait, which includes the steps of cleaning and precooling the bait, freezing to a pre-selected temperature, sequentially condensing water vapor, evacuating air and non-condensable vapors, and slowly heating the bait at specified temperature and vacuum, and subsequently separating the fishing bait and packaging.

In U.S. Pat. No. 4,160,847, entitled "Process of Improving the Freeze-Thaw Stability of Fish Bait", there is disclosed a method to improve freeze-thaw stability of fish bait, such as herring, by impregnating the fish by vacuum with a water soluble, non-toxic glycol, and the bait is subsequently drained and frozen for future use.

Finally, U.S. Pat. No. 2,693,417 describes the use of triethylene glycol at 35% concentration as a solution preservative for non-frozen fish after treatment with formaldehyde. Specifically, the '417 patent describes the placement of 100 gallons of live herring into 200 gallons of sea water containing a solution of formaldehyde and a wetting agent, the formaldehyde present at a concentration of about 0.5%, and the fish are allowed to die in said solution. This is followed by treatment with a second formaldehyde solution, again at about 0.5% concentration. The '417 patent notes that at such concentrations of formaldehyde the fish bait retains the color and firmness of its natural state; i.e. it is not enhanced.

The '417 patent goes on to report that this double treatment with dilute formaldehyde is followed by treatment with a solution of water containing 0.5% ammonium carbonate, and the pH is adjusted to about 8.5. The '417 patent emphasizes the importance of such treatment with base to remove the formaldehyde by conversion to hexamethylenetetramine. The pH is then adjusted to the range of 7.6–8.0 and the fish are allowed to stand in such solution until ready for a final bath which is composed of a solution of 35% polyhydric alcohol (i.e., triethylene glycol) and the balance water. The fish are allowed to stand in this relatively concentrated bath for about 4 days, and then packaged.

Accordingly, it is an object of this invention to overcome the disadvantages of the prior art and provide a process and product formed thereby which amounts to a preserved fish bait, wherein said bait will not be subject to bacterial and/or viral decay, and wherein the bait will simultaneously demonstrate improved trolling capability over its natural state, due to increased hardness. Moreover, it is also an object of the invention to provide said bacteria free and hardened bait in a form which has an extended shelf life when placed in a sealed container.

Finally, it is also an object of this invention to provide the above method of preserving fish bait wherein the bait is hardened and of a much greater thickness than preserved fish bait of the prior art, as herein disclosed.

SUMMARY OF THE INVENTION

A method for preserving fish bait comprising supplying fish bait and immersing said bait in a first aqueous sterilizing solution wherein the concentration of said sterilizing solution and the time of immersion in said solution are adjusted to prevent decay via bacterial action and to increase the hardness of the bait over its natural state. The bait is then removed from the sterilizing solution and immersed in running water to remove substantially residual sterilizing solution which therein provides a hardened sterilized bait. The hardened and sterilized bait is then placed in a container which contains a sufficient amount of a second aqueous solution which prevents further bacterial and/or viral decay and which maintains said fish in a hydrated state for use as a bait product.

In product form, the present invention comprises a preserved fish bait comprising fish bait which is hardened over its natural state, said bait further containing a sufficient amount of aqueous alcoholic solution to hydrate said bait and to substantially prevent bacterial decay.

DETAILED DESCRIPTION OF THE PREFERRED EMBODIMENTS

Generally, the sterilizing solution comprises formalin. Formalin is known as a an aqueous 37–50% wt. solution of formaldehyde which may contain methanol. Typically formalin is available as a 40% wt. formaldehyde solution. Preferably, the fish bait are sterilized/hardened by placement into a aqeuous solution containing 10% of a 40% wt. formaldehyde solution, which therefore corresponds to a formaldehyde concentration of about 4.0% wt. Addition of less than about 10.0% wt. formalin appears to result in less than optimal bait preservation and hardness. In a preferred embodiment of the present invention, the bait is freshly caught herring, shrimp, opelu (mackerel), smelt and/or other common fish bait material. Accordingly, 10% of a 40% wt. formalin has been found as optimum with such bait, but concentrations in the range of about 8.0 to 100% wt. are also effective for purposes of the present invention.

The time of soaking in the aqueous sterilizing/hardening solution is preferably about 48 hours. More specifically, exposure times of 24 hrs at 100% wt. concentration or 48 hrs at 10% wt. have been found particularly satisfactory in accordance with the objective of sterilizing and hardening the fish for use as a bait product.

The concentration of formalin, and the time of soaking, can both be readily adjusted, so that both bacterial/viral decay is prevented, and the fish simultaneously become hardened by the process. In accordance therefore with the present invention, lower concentrations (e.g., concentrations of about 8–9% wt.), and longer exposure (e.g., exposure greater than 12–24 hours) have been found to operate in concert to achieve both sterilizing and hardening objectives. For example, at a concentration of about 8% wt. the corresponding immersion time is about 24 hours. When the concentration is 100% wt., the immersion time is reduced to about 12 hours.

Subsequent to this first step of sterilizing and hardening, and before use as a bait product, the sterilizing solution, and the active ingredient therein, which as noted above is preferably formaldehyde, is washed out of the bait by a water rinsing operation, which simply stated, involves exposure to running fresh or salt water for a period of about 24 hours. Those skilled in the art will appreciate, however, that the amount of water varies with the amount and size of the fish bait employed, and the concentration of formaldehyde involved.

Accordingly, once the fish bait is washed substantially free of a fish odor, the bait is conveniently placed in a container, preferably a plastic bag, and in the process, treated with a small amount of an alcoholic solution, wherein the alcohol is just enough to keep the fish wet and hydrated, and to prevent further bacterial and odor-causing activity. Alcohols which have been found suitable include preferably the monohydric alcohols (i.e., alcohols containing a single hydroxy functionality) such as grain alcohol (ethyl alcohol) and isopropyl alcohol. Preferred concentrations of grain alcohol is about 70% wt. and in the case of isopropyl alcohol, about 45–50% wt. The plastic bag is then sealed, and the bait therein will have almost an unlimited shelf life.

With regards to the hardening process noted above, it is worth noting that the present invention provides a process for hardening of fish bait wherein the fish bait is about 1" thick (measured side to side). The prior art does not teach or suggest that fish bait of such thickness can be sterilized and hardened and prepared with practically an unlimited shelf life, as now herein disclosed.

That is, when a 0.5% of a formalin (40% formaldehyde) solution was employed, e.g. as taught by U.S. Pat. No. 2,693,417, such 0.5% formalin was found to have almost no effect on hardening of the fish. Such 0.5% formalin concentration (which therefore provides about 0.2% formaldehyde) also failed to stop the digestive process in the stomach of the fish, and the "guts" of the fish were observed to have rotted after 5 days. Similarly, when the formalin solution was raised to that of about 1.25%, which provides a formaldehyde concentration of 0.5, once again the fish were not hardened, and the digestive process was not disrupted.

By contrast, when the process of the present invention is employed, wherein a preferred 10% formalin solution is employed (thereby providing about 4% formaldehyde), and the fish bait is immersed for the preferred time of about 48 hours, it is believed that the hardening process proceeds as the cell walls of the fish become stiff and dehydrated when the water leaves the cells by osmosis due to the higher concentration of the formalin outside the fish's body. The negative osmotic pressure is then apparently relieved by the absorption of the formalin into the cells through the cell walls, causing stiffening and hardening. Once hardened, the process is not reversible and the washing removes much of the formalin which is then replaced by alcohol.

In the context of the utility of the present invention, as noted above, the bait disclosed herein provides a hardness over its natural state that will avoid tearing when dragged through the water at conventional fish trolling speeds. In addition, due to this increased hardness, faster trolling speeds are now possible, which speeds were not available with the fish bait of the prior art. That is, the bait of the prior art, which typically amounted to frozen baits of one form or another, generally shear apart in relatively short period of time in a conventional trolling operation, and accordingly, the bait of the present invention, on this basis alone, provides new options to the fish trolling industry.

In addition, the bait herein advances over the state of the art inasmuch as the bait can be stored indefinitely, without the need to maintain the bait in a frozen state, and unlike frozen bait, remains hydrated, and will not accumulate an unpleasant odor.

What is claimed is:

1. A method for preserving fish bait comprising:
    a) supplying fish bait and immersing said bait in a first aqueous sterilizing solution comprising about 8–100% (wt) of an aqueous solution of formalin, said formalin solution containing formaldehyde at a concentration of at least about 37% wherein the time of immersion in said solution is adjusted to prevent decay via bacterial action and to increase the hardness of the bait;

b) removing said bait from the sterilizing solution and immersing in running water to remove substantially residual sterilizing solution to provide a hardened sterilized bait; and c) placing the hardened and sterilized bait of step b) in a container which contains a sufficient amount of a second aqueous solution which prevents further bacterial and/or viral decay and which maintains said fish in a hydrated state for use as a bait product.

2. The method of claim 1 wherein the fish bait is selected from the group consisting of herring, shrimp, mackerel or smelt.

3. The method of claim 1 wherein the immersion time is about 12 to 24 hrs.

4. The method of claim 1, wherein said first sterilizing solution comprises 10.0% (wt.) of said formalin solution and the corresponding immersion time is about 48 hours.

5. The method of claim 4 wherein the aqueous solution of formalin contains formaldehyde at a concentration of 40%.

6. The method of claim 1 wherein said second aqueous solution comprises isopropyl alcohol at a concentration of about 45 to 50% (wt.).

7. The method of claim 1 wherein said second aqueous solution comprises a grain alcohol at a concentration of about 70% (wt.).

8. The method of claim 1, wherein said container is sealed.

9. The method of claim 1, wherein step b) is carried out for about 24 hours.

10. A preserved hardened sterilized fish bait product, prepared according to the following process:

a) supplying fish bait and immersing said bait in a first aqueous sterilizing solution comprising about 8–100% (wt.) of an aqueous solution of formalin, said formalin solution containing formaldehyde at a concentration of at least about 37% wherein the time of immersion in said solution is adjusted to prevent decay via bacterial action and to increase the hardness of the bait;

b) removing said bait from the sterilizing solution and immersing in running water to remove substantially residual sterilizing solution to provide a hardened sterilized bait; and c) placing the hardened and sterilized bait of step in a container which contains a sufficient amount of a second aqueous solution which prevents further bacterial and/or viral decay and which maintains said fish in a substantially hydrated state for use as a bait product.

11. The hardened fish bait product of claim 10 wherein said fish bait is selected from the group consisting of herring, shrimp, mackerel, or smelt.

12. The hardened fish bait of claim 10 wherein the immersion time is about 12 to 24 hrs.

13. The hardened fish bait of claim 10, wherein said first aqueous sterilizing solution contains 10% formalin, and the fish is immersed in said sterilizing solution for about 48 hours.

14. The hardened fish bait of claim 10 wherein said second aqueous solution comprises a grain alcohol at a concentration of about 70% (wt).

* * * * *